(12) United States Patent
Wishart (10) Patent No.: US 7,882,915 B1
(45) Date of Patent: Feb. 8, 2011

(54) VEHICLE LATERAL-MOTION APPARATUS

(76) Inventor: Randell J. Wishart, 316 California Ave., #314, Reno, NV (US) 89509

( * ) Notice: Subject to any disclaimer, the term of this patent is extended or adjusted under 35 U.S.C. 154(b) by 0 days.

(21) Appl. No.: 12/378,253

(22) Filed: Feb. 10, 2009

Related U.S. Application Data (60) Provisional application No. 61/065,435, filed on Feb. 11, 2008.

(51) Int. Cl.
*B60S 9/205* (2006.01)
(52) U.S. Cl. .................. 180/203; 180/199; 180/8.5
(58) Field of Classification Search .............. 180/199, 180/203, 8.1, 8.4, 8.5, 8.6, 761
See application file for complete search history.

(56) References Cited

U.S. PATENT DOCUMENTS

| | | | | |
|---|---|---|---|---|
| 1,833,288 A | * | 11/1931 | Hedstrom | 180/203 |
| 2,662,604 A | * | 12/1953 | Henderson | 180/203 |
| 2,862,567 A | * | 12/1958 | Dull | 180/203 |
| 2,942,676 A | * | 6/1960 | Kraus | 180/8.5 |
| 3,150,733 A | * | 9/1964 | Goebel | 180/8.1 |
| 3,638,747 A | * | 2/1972 | Althoff | 180/8.5 |

* cited by examiner

*Primary Examiner*—Anne Marie M Boehler
(74) *Attorney, Agent, or Firm*—James M. Ritchey (57) ABSTRACT

A vehicle lateral-motion apparatus that, under the direction of a user, moves a vehicle to which it is mounted in a generally perpendicular direction to a vehicle axis that extends between the front and rear of the vehicle includes a vehicle lifting assembly for elevating the vehicle above a roadway and lowering the vehicle back to the roadway as directed by a user and lateral-motion assembly coupled to the lifting assembly for displacing the vehicle to one side or the other of the vehicle axis while the vehicle is elevated above the roadway.

8 Claims, 9 Drawing Sheets

VEHICLE LATERAL-MOTION APPARATUS

CROSS-REFERENCE TO RELATED APPLICATIONS

This application claims priority from U.S. provisional application Ser. No. 61/065,435 filed on Feb. 11, 2008.

BACKGROUND OF THE INVENTION

1. Field of the Invention

This subject invention pertains generally to an apparatus that permits a vehicle to be moved in a lateral direction or in a direction that is perpendicular to the general alignment of the vehicle during normal travel. More particularly, when fitted to any desired type of land vehicle, the subject apparatus moves that vehicle in a perpendicular direction to that of normal travel by temporarily lifting the vehicle and shifting it laterally in a series of directed hops or steps to one side or the other (as determined by a user) of the normal direction of travel.

2. Description of Related Art

Traditional vehicles find difficulties in lateral or perpendicular motion to that of the approximate direction of travel. In other words, unless each supporting wheel is capable of extensive pivoting ability, vehicles usually make multiple sweeping motions to move perpendicularly to the approximate line of travel. If the vehicle is a trailer, or equivalent, the towing vehicle either directly travels in a forward pathway that brings the trailed to the position desired or considerable effort and skill is required to back up the trailer into the desired position, often with either technique not resulting in position initially desired. The subject invention addresses the difficulties of moving a vehicle in a direction perpendicular to (at approximately right-angles to) normal travel, especially when vehicle maneuverability is limited by various space considerations.

BRIEF SUMMARY OF THE INVENTION

The subject invention relates to an apparatus that permits a vehicle to be moved in a lateral direction or in a direction that is perpendicular to the general alignment of the vehicle during travel. More particularly, when fitted to any desired type of land vehicle, the subject apparatus moves that vehicle in an approximately perpendicular direction to that of normal travel by temporarily lifting the vehicle in a series of hops to one side or the other (as determined by a user) of the normal direction of travel. Thus, the subject invention addresses the difficulties of moving a vehicle in a direction perpendicular to (at approximately right-angles to) normal travel when vehicle maneuverability is limited by various space considerations. The subject invention is adaptable for use with automobiles, trucks, trailers, motor-homes, various military vehicles, and the like. When in use, the subject invention lifts the desired vehicle, then directs motion of the lifted vehicle in an angled direction, and then lowers the vehicle. This "angled hopping" motion or stepping is repeated until the vehicle is moved as far as desired in a direction approximately perpendicular to normal travel alignment. One or more of the subject devices may be fitted to any vehicle, depending on the physical characteristics of the vehicle such as length, width, weight, vehicle type (trailer, prime mover, bus, motor-home, etc.), and the like. In general, the subject device hops or steps the desired vehicle to one side or the other and may be utilized for parking purposes, to avoid undesirable objects or conditions (perhaps a muddy or damaged roadway or the like), and equivalent situations that mandate or require directional movement approximately perpendicular to the line of normal travel.

An object of the subject invention is to provide a means for moving a vehicle in a direction that is approximately perpendicular to the direction of travel.

Another objective of the invention is to disclose a device that moves any desired vehicle in a lateral direction that is generally perpendicular to the central axis (extending between the front and rear of the vehicle) of the vehicle.

A further object of the invention is to disclose an apparatus that temporarily lifts a vehicle in a desired sideways direction, lowers it, repositions itself to a central orientation, repeats the process, and by a series of "small hops or steps" moves the vehicle in the desired sideways direction for a desired distance.

Still another object of the present invention is to disclose device that walks a vehicle sideways in a series of steps in which the vehicle is lifted from a supporting surface, directed left or right from the direction of travel, lowered to the supporting surface, thereby causing a stepped lateral displacement, and repeated a sufficient number of times to move the vehicle to a desired position.

Yet a further object of the present invention is to describe a vehicle lateral motion devise having vehicle lifting means, vehicle lateral motion means, vehicle lowering means, and operational control means.

Disclosed is a vehicle mounted lateral-motion apparatus that, under the direction of a user, moves the vehicle in a generally perpendicular direction to a vehicle axis that extends between the front and rear of the vehicle, comprising: first force generating means for powering the lateral-motion apparatus to temporarily lift the vehicle; second force generating means for directing the vehicle to move either left or right, relative to the vehicle axis, as directed by the user; and a lifting/directing assembly fitted to the vehicle and connected to the first and the second force generating means that lifts the vehicle when powered by the first force generating means as directed by the user and moves the vehicle either left or right as directed by the user implementing the second force generating means. A preferred first force generating means comprises a compressed gas delivered to an expandable bladder within the lifting/directing assembly that lifts the vehicle upon expansion and lowers the vehicle upon contraction. A preferred second force generating means comprises first and second solenoids, wherein when the first solenoid is activated it directs motion in an opposite direction to when the second solenoid is activated. Preferably, the lifting/directing means comprises an expandable/contractible bladder that lifts the vehicle when expanded and lowers the vehicle when contracted.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 8. It will be appreciated that the apparatus may vary as to configuration and as to details of the parts, and that the method may vary as to the specific steps and sequence, without departing from the basic concepts as disclosed herein.

The subject system is designed to move any type of vehicle in a lateral direction (to either side of the front-to-rear axis of the vehicle) for a desired distance. Vehicles that may find the subject apparatus useful are automobiles, trucks, buses, military vehicles, motor-homes, and varied trailers. In particular, a trailer will be utilized as an exemplary vehicle for descriptive purposed in this disclosure and not by way of limitation. The vehicles may be moved by internal combustion engine power, electric motor power, or free from any direct power. Frequently, lateral or sideways motion of a vehicle is handy or required to facilitate entering or exiting a location, escaping from a muddy or damaged roadway, or in parking a trailer and the like. For example, in backing up a trailer there are often necessary or desired alignment situations that simply cannot be achieved with conventional towing hitches. The subject invention is able to move a vehicle in a sideways direction to accomplish normally difficult alignments in parking or turning or in avoiding obstacles or hazards.

Depending of the type of vehicle and desired overall lateral-motion effect needed, the subject device may be mounted to the vehicle as a single unit, paired units, any multiple of units, front-positioned, rear-positioned, middle-positioned, and combinations thereof or the equivalents. For example, in this disclosure (as seen specifically FIGS. 1-8) a towed trailer is fitted with a single subject apparatus to move the trailer to the left of right of its central front-to-rear axis, as directed by the user operating an associated controller.

Figure 1:
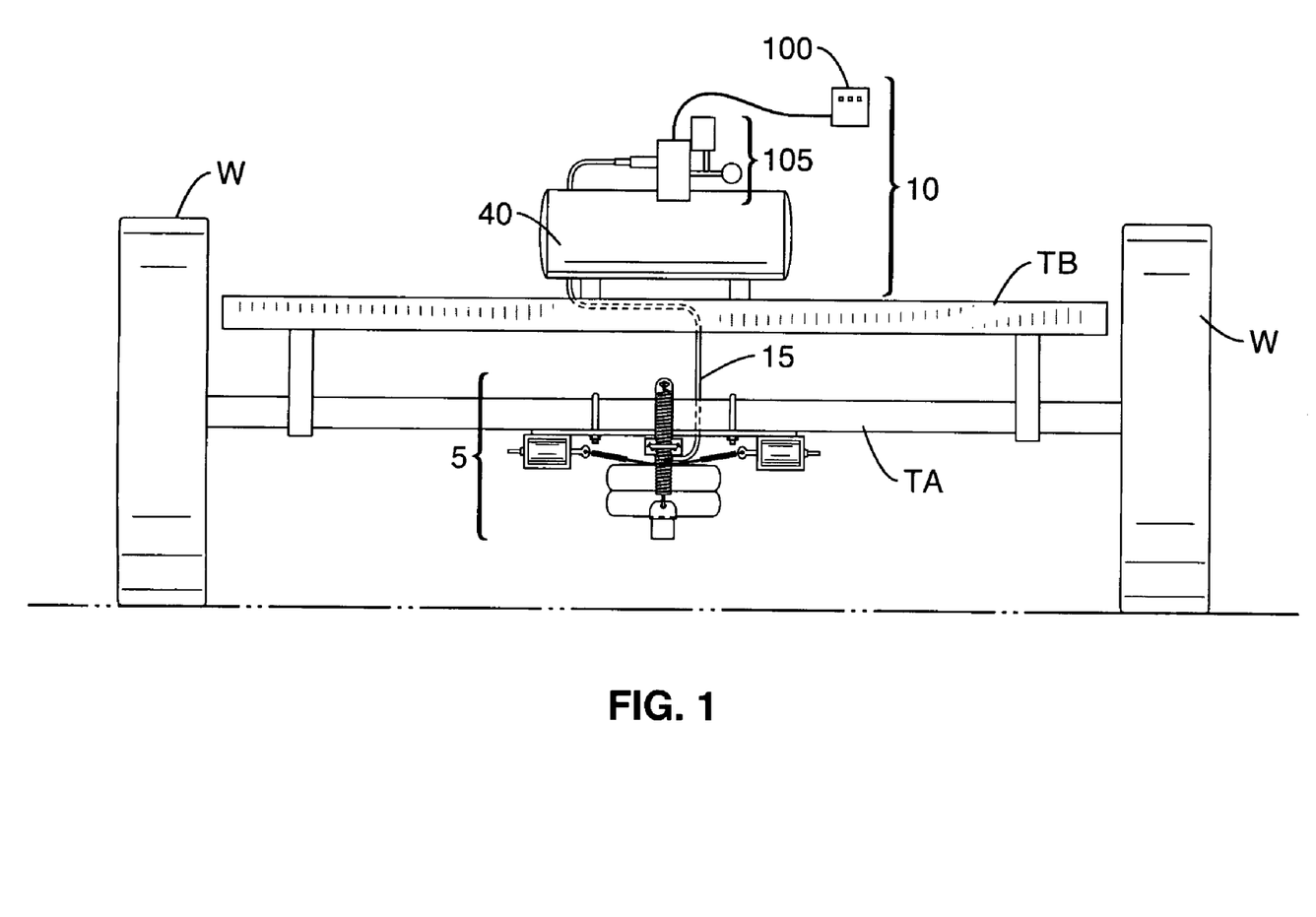
FIG. 1 is rear view of a trailed fitted with the subject invention.
Figure 2:
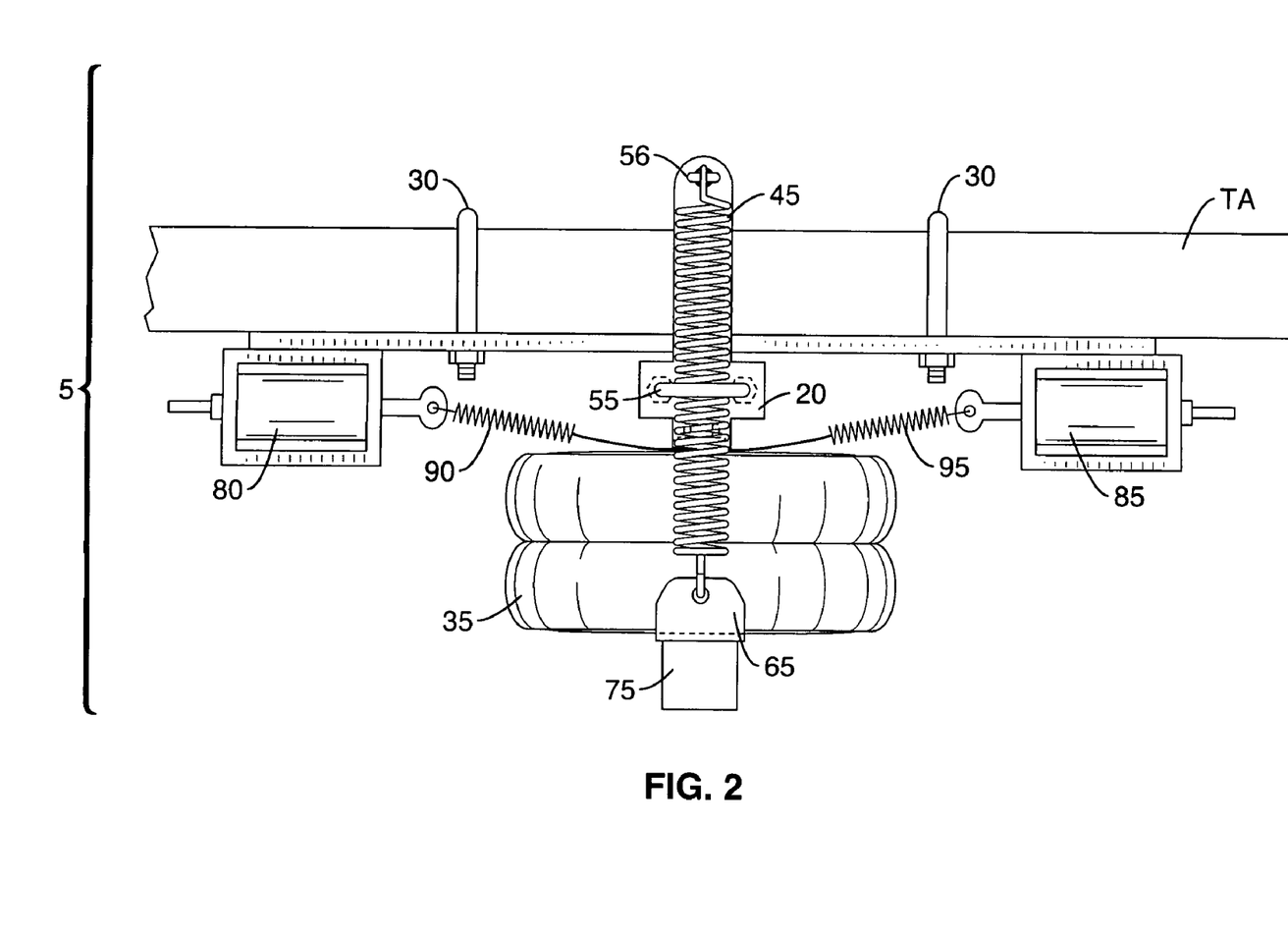
FIG. 2 is a close-up view rear of the subject invention (larger view seen in FIG. 1) fastened to a suitable cross-member on a vehicle.
Figure 3:
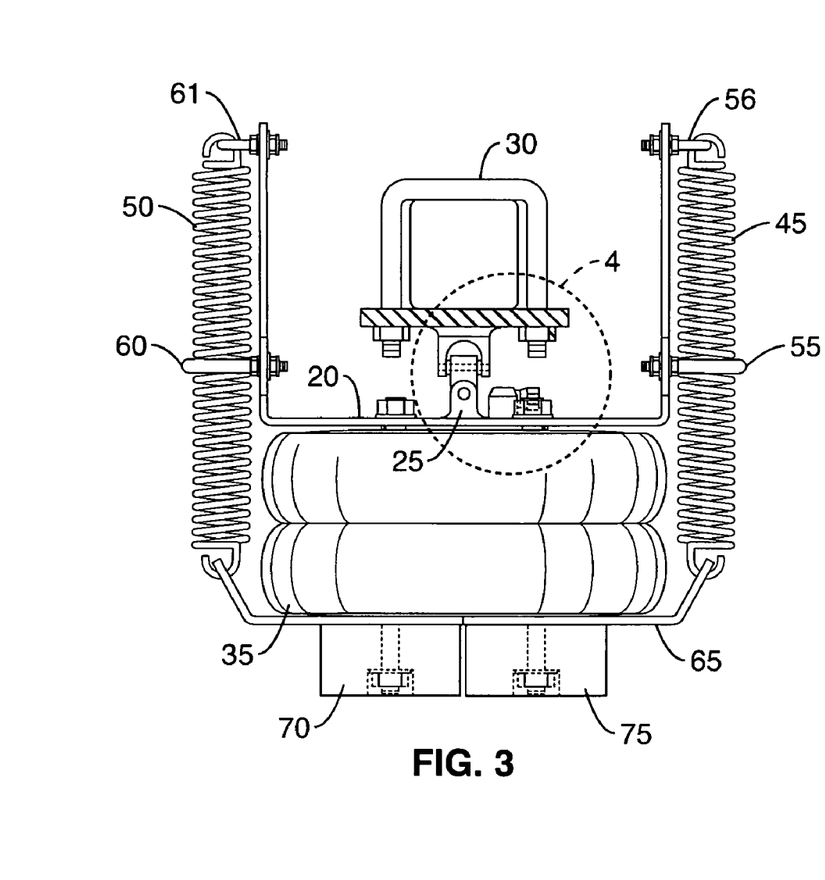
FIG. 3 is a close-up side view of the subject invention fastened to a suitable cross-member on a vehicle.
Figure 4:
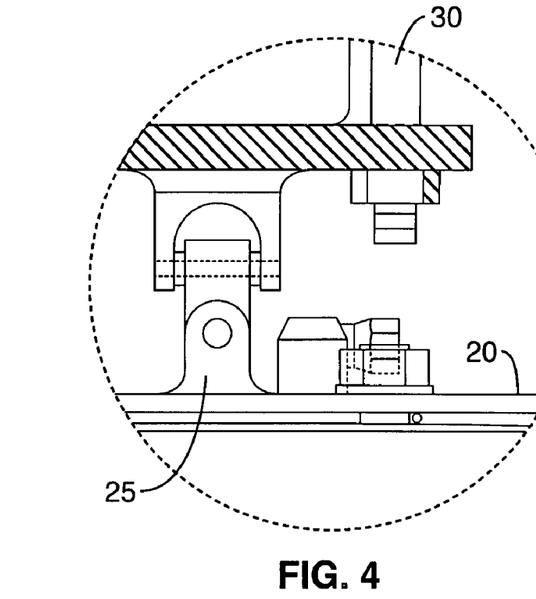
FIG. 4 is an expanded view of the dash-circled "4" region seen in FIG. 3 showing the universal coupler.
Figure 7:
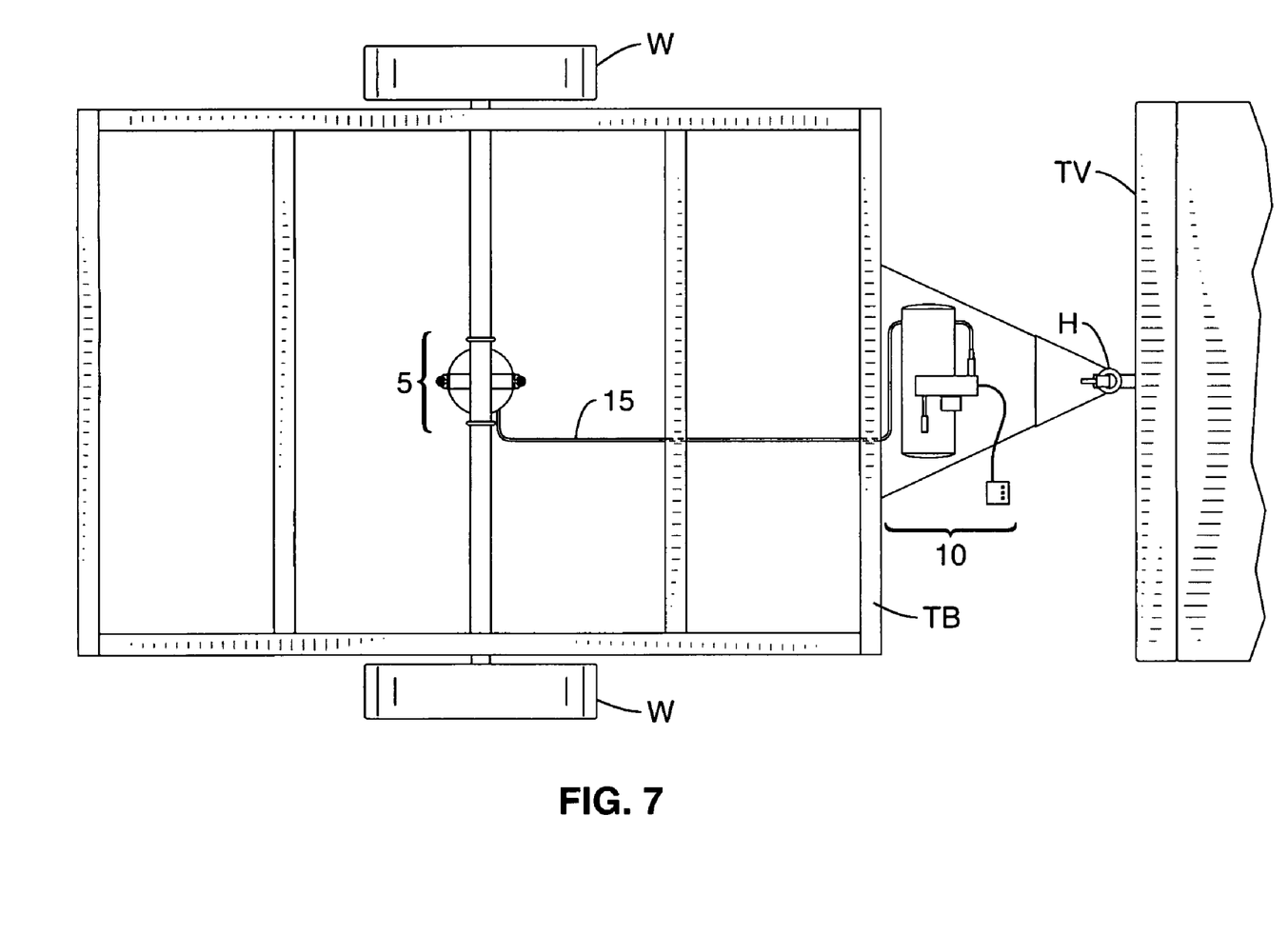
FIG. 7 is a top view of the subject invention fastened to a trailer in which the trailer is depicted in an initial or starting position before activation of the subject invention.

As seen in FIG. 1 from the rear of the trailer (and in FIG. 7 from the top of the trailer) a preferred embodiment of the subject invention comprises a lifting/directing assembly 5, a gas pressure and electrical control module 10 coupled to the lifting/directing assembly 5 by a suitable gas-electric transfer means 15. All of these components may be mounted to one vehicle or distributed on two or more vehicles. The trailer depicted in the figures shows the trailer bed TB, the trailer axle TA, and the paired wheels W (shown in FIG. 7 are the same components and the towing vehicle TV and trailer hitch H assembly). The lifting/directing assembly 5 is secured to the trailer's axel TA, while the gas pressure and electrical control module 10 is mounted to the trailer's bed TB, proximate the front of the trailer. The electrical control module 10 has user activated controls for elevating the vehicle, moving the elevated vehicle to the right of the vehicle's axis and to the left of the vehicle's axis, and for lowering the vehicle after lateral (right/left)-motion has occurred.

The function of the lifting/directing assembly 5 (shown from the rear of the trailer in FIG. 1) is to physically lift (and lower) either the entire vehicle or a portion of the vehicle and direct its lateral or sideways (right/left) displacement in a desired direction with one or a plurality of small steps, jumps, or hops (specifically the stepping-action is shown in FIGS. 5A-5C, 6A-6C, and 8 and discussed in detail below). The lifting/directing assembly 5 (as seen in close-up in FIGS. 2-4) comprises a mounting plate 20 to which various additional components fasten and to which the lifting/directing assembly 5 attaches to the underside of the vehicle via a universal joint 25 and one or more clamping brackets 30 in a suitably secure and structurally sound location on the vehicle. Secured to the mounting plate 20 is a lifting means that in one preferred embodiment is a gas suspension bladder device 35 that expands upon activation and contracts upon deactivation. Such bladder devices 35 are readily available from standard supply companies and are normally used from raising and lowering desired objects (such as "lifters" found in vehicles).

Although other lifting forces and devices (mechanical, electrical, hydraulic, and the like) other than pressurized gas and an expandable bladder may be utilized in the lifting/lowering process of the subject invention, the currently described pressurized gas is normally generated by any suitable means such as a compressor and stored in a pressure tank (see FIG. 1 for an typical compressor/tank unit fitted to the front of a trailer to which the subject invention is also mounted). The pressurized gas is normally air, but could be nitrogen, carbon dioxide, or other equivalent gas and merely stored in a suitably sized gas cylinder and not actually pressurized by an on-site compressor. Usually, the pressurized gas is transferred to the bladder 35 via a suitable pressure line or hose 15 (in the subject figures, the gas-electric transfer means 15 contains both the pressurized gas and the electrical wires to operate the solenoids 80 and 85). Usually, a pressurized gas, such as air, is utilized for activation and held in a suitable container 40.

To assist in contracting the bladder device 35, resilient means are provided such as the shown paired springs 45 and 50 (the bladder means 35 itself may be designed to contain internal or integral retraction means). The paired springs 45 and 50 are secured to the mounting plate 20 by suitable means such as the shown U-bolts 55, 56, 60, and 61 and to a bottom plate 65 below the bladder device 35. A traction gripping means is secured to the lower portion of the bottom plate 65, usually one or more resilient foot pads 70 and 75 are anchored to a bottom bracket 65.

Opposing first and second lateral-motion means that in the depicted preferred embodiment are electric solenoids 80 and 85 are attached to the mounting plate 20 via coupling means, usually springs 90 and 95 or similar means that may or may not be resilient themselves.

To direct (normally a user initiated action via the control unit 100) the gas suspension bladder device 35 to one side or the other one of the two solenoids 80 or 85 is activated by the user via the electronic control unit 100 (clearly, preferred embodiments may include wired or remote means for operational control of the lifting, lowering, and stepping to the left or right) and the pressure compressor/tank 40 associated regulatory valves and gauges 105.

Figure 5A:
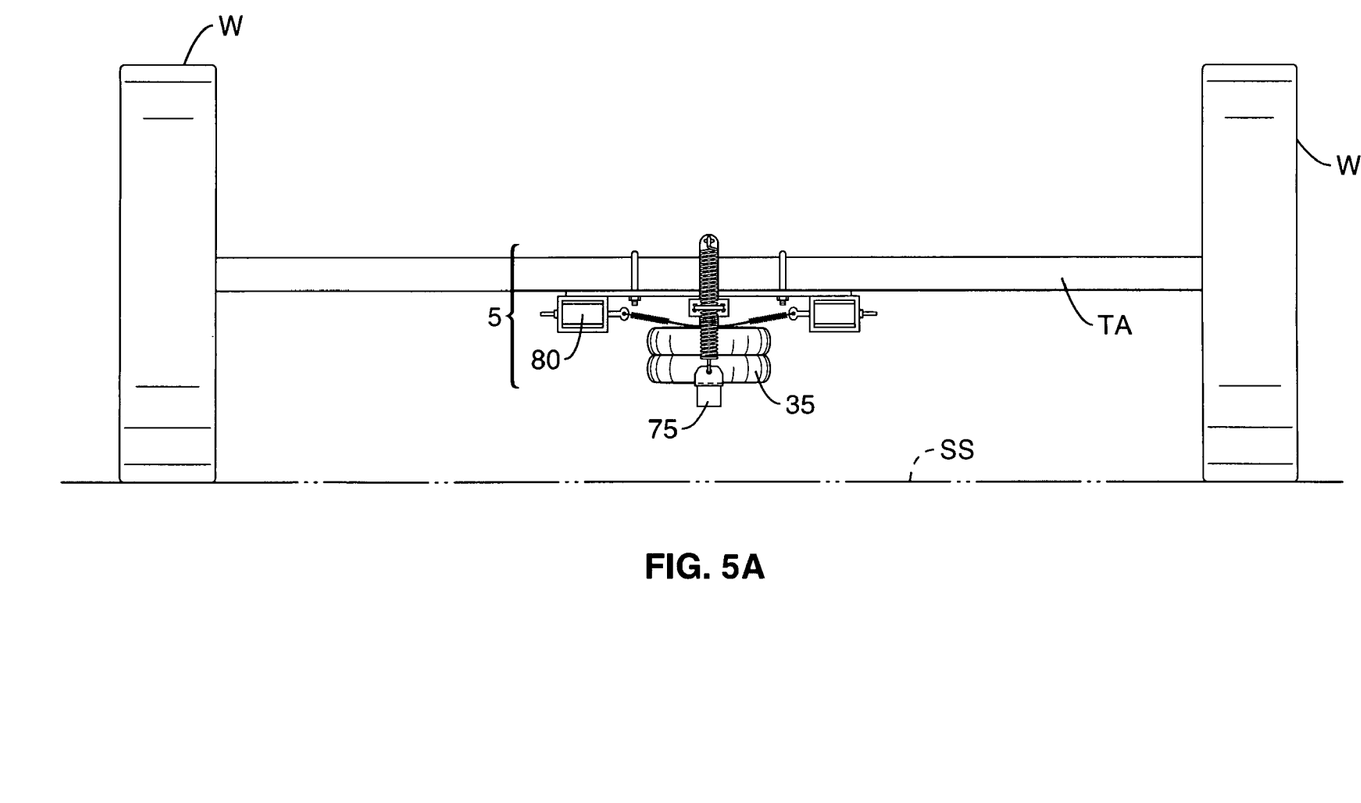
FIG. 5A is a rear view of a trailer mounted with the subject invention in an initial non-activated position.
Figure 5B:
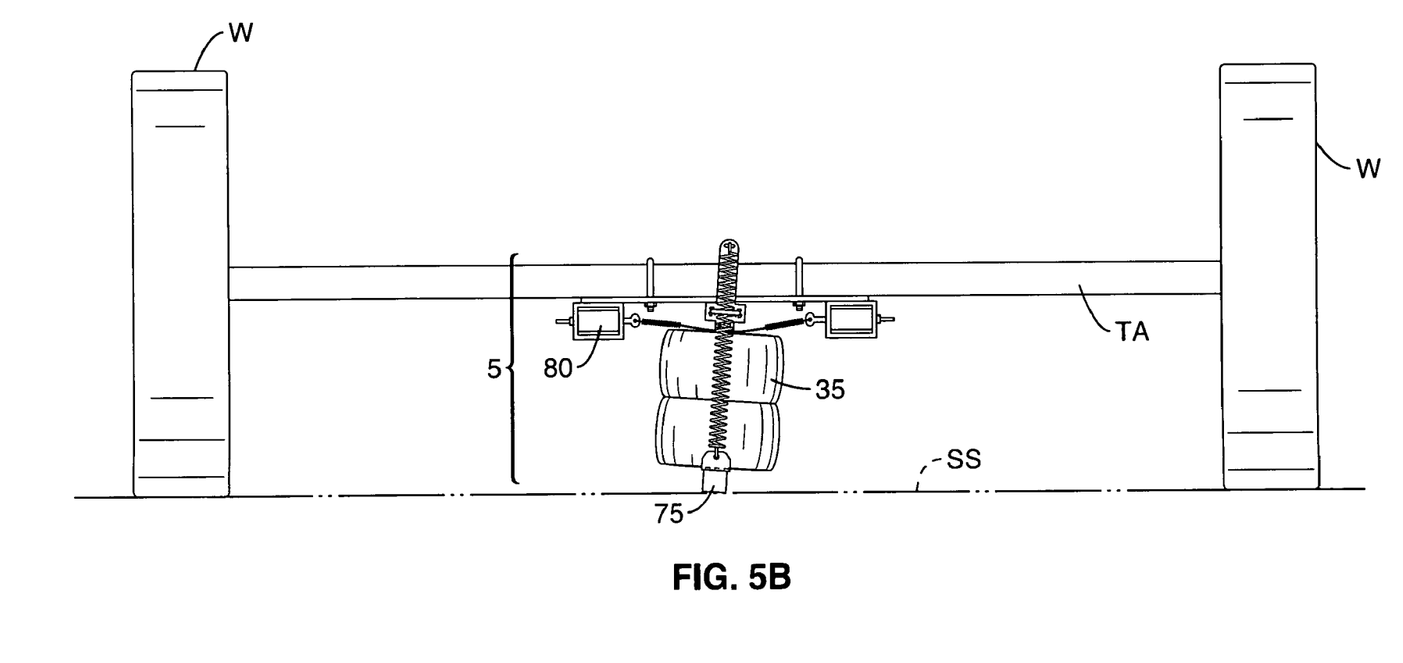
FIG. 5B is a rear view of a trailer mounted with the subject invention in an expanding position in which the subject device is being drawn laterally to the left so that the trailer is forced to the right during the subsequent lifting step.
Figure 5C:
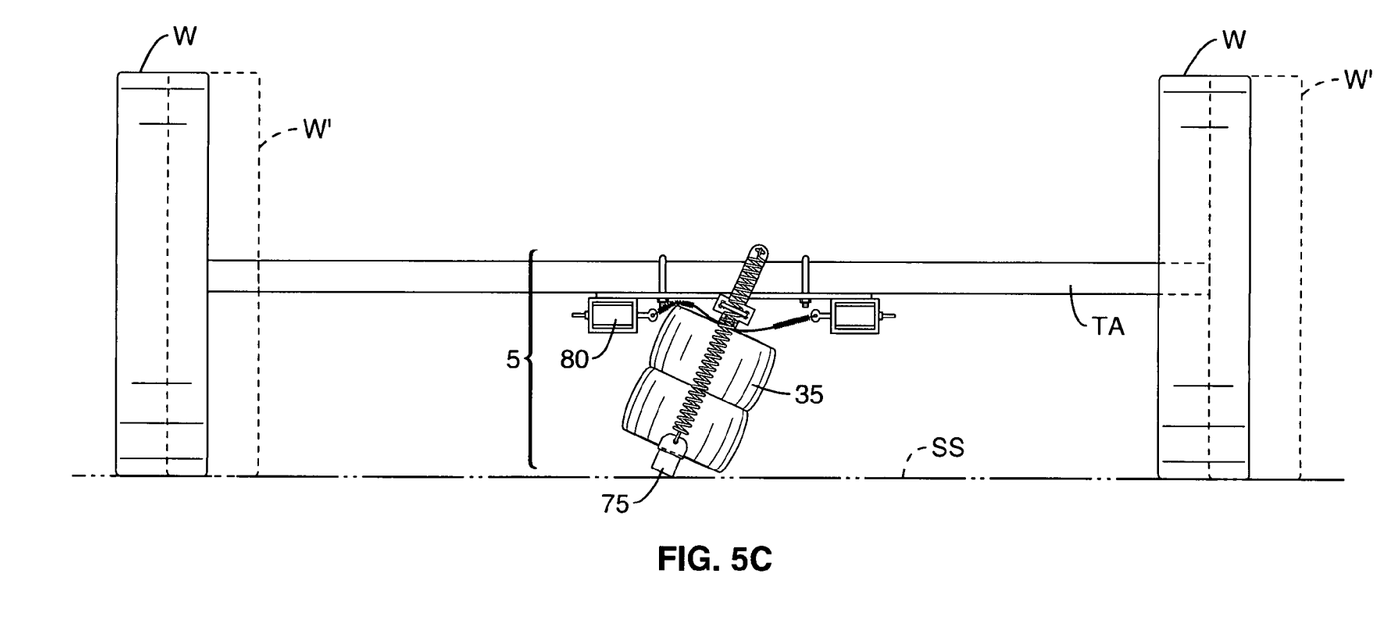
FIG. 5C is a rear view of a trailer mounted with the subject invention in a fully expanded position in which the subject device is drawn fully to the left so that the trailer has stepped to the right, as seen with the displaced-dashed lines.
Figure 6A:
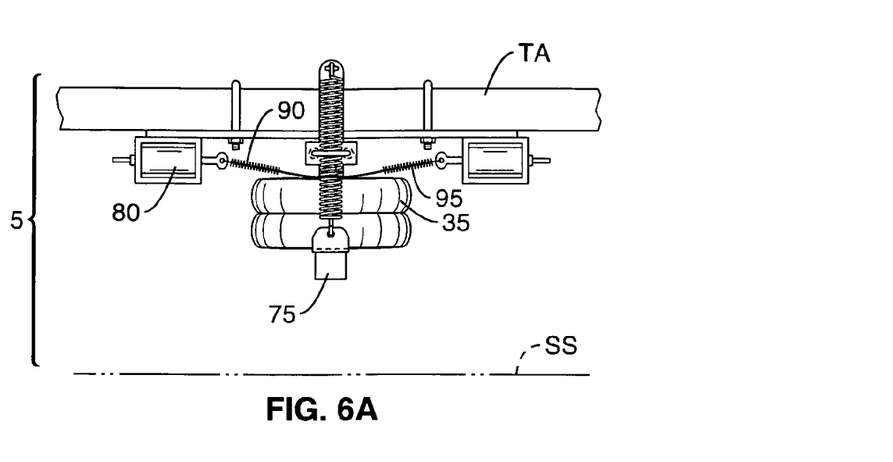
FIG. 6A is a close-up rear view of a trailer mounted with the subject invention (larger view seen in FIG. 5A) in an initial non-activated position.
Figure 6B:
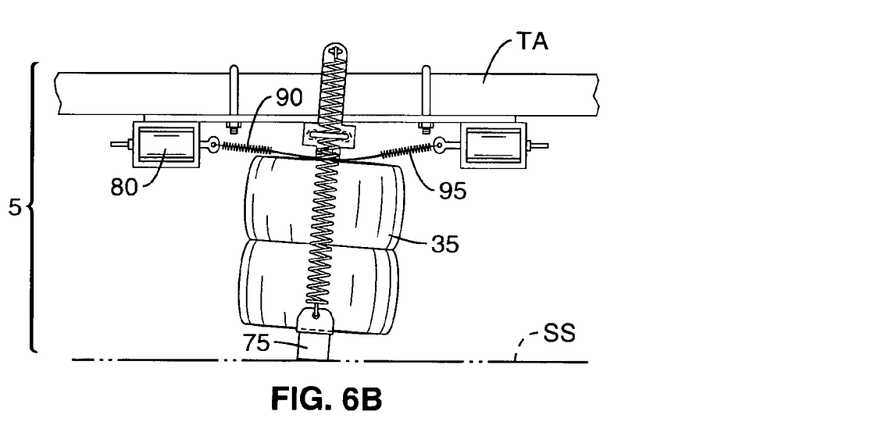
FIG. 6B is a close-up rear view of a trailer mounted with the subject invention (larger view seen in FIG. 5B) in an expanding position in which the subject device is being drawn laterally to the left so that the trailer is forced to the right during the subsequent lifting step.
Figure 6C:
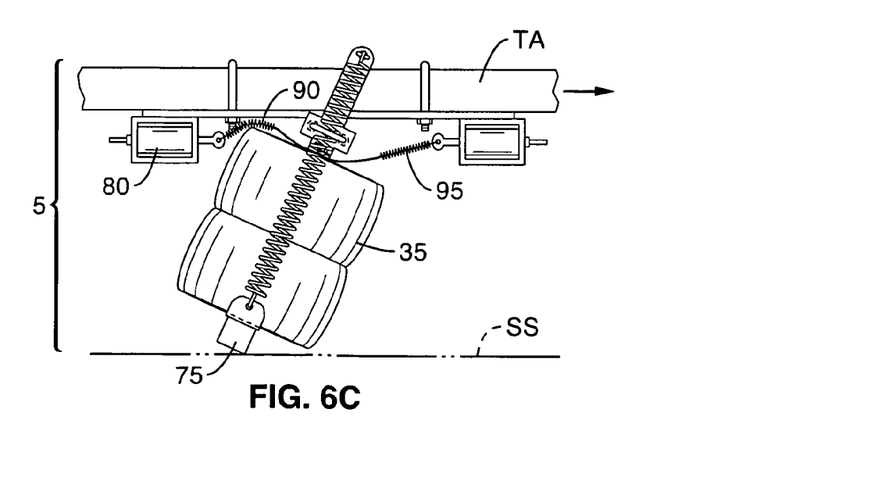
FIG. 6C is a close-up rear view of a trailer mounted with the subject invention (larger view seen in FIG. 5C) in a fully expanded position in which the subject device is drawn fully to the left so that the trailer has stepped to the right, as indicated by the depicted arrow to the right.

In action, the stepping or hopping action of the subject apparatus is seen in FIGS. 5A, 5B, and 5C. FIG. 5A shows the lifting/directing assembly 5 suspended below and to the trailer's axel TA and oriented in a generally vertical alignment with the vehicle supporting surface SS immediately below (normally the supporting surface SS is a roadway made of any composition). For this example the user desires to move the trailer to the right, as viewed from the rear of the trailer. When the user activates the subject invention via the control unit 100, the bladder device 35 expands, the appropriate solenoid 80 pulls the expanding bladder device 35 to the left (again, as viewed from the rear of the depicted trailer), and the resilient foot pads 70 and 75 (only foot pad 75 is seen from the rear of the trailer) encounter the supporting surface SS. When the supporting surface SS is encountered by the foot pads 70 and 75 and the solenoid 80 is angling the expanding bladder device 35 to the left, the trailer is lifted and directed to the right into a new lateral position as seen in FIG. 5C in which the paired wheels W move to a new location W' (a net shift to the right for the trailer). For clarity; the sequence of stepping events is shown again in close-up in FIGS. 6A, 6B, and 6C.

Figure 8:
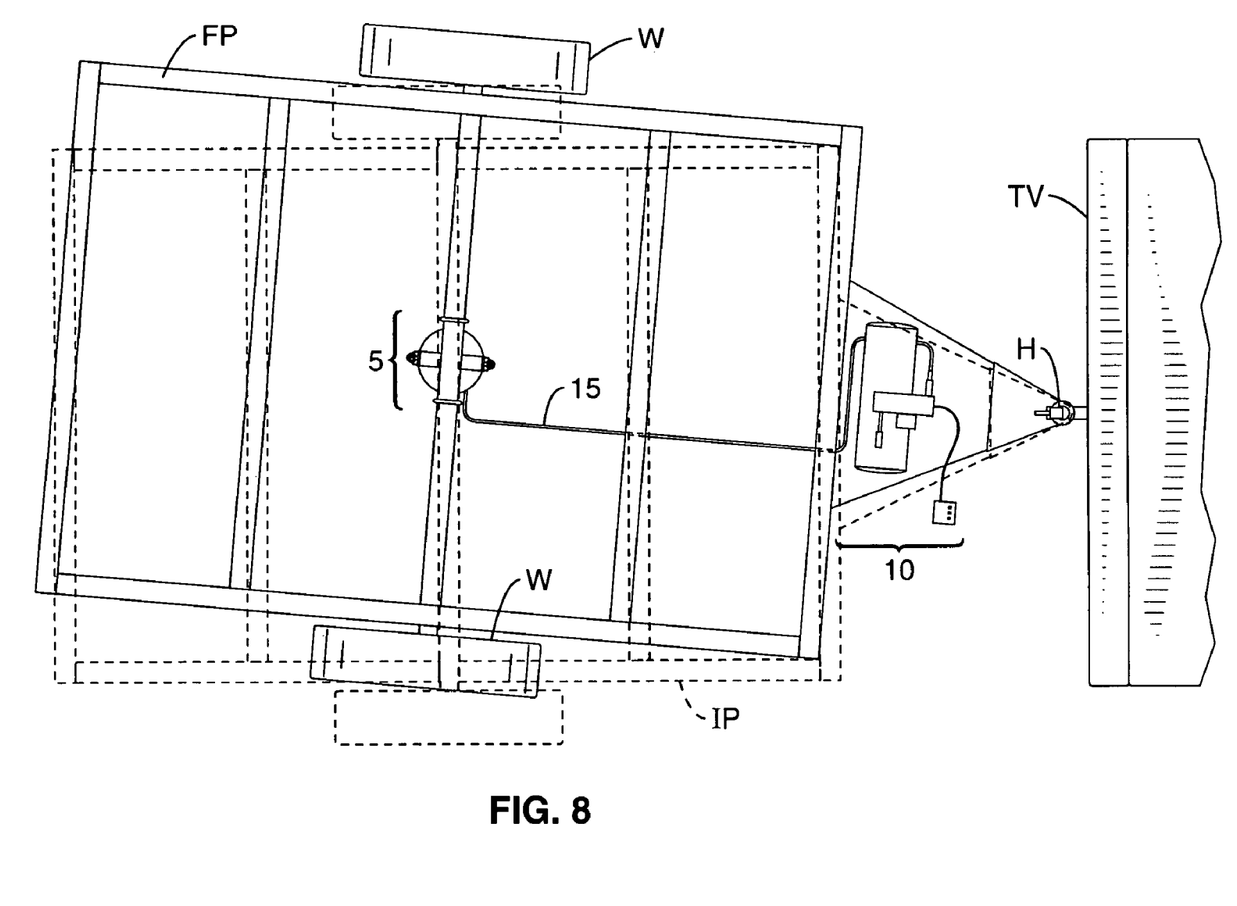
FIG. 8 is a top view of the subject invention fastened to a trailer in which the trailer is depicted shifting from an initial position (dashed lines) to a final or ending position (solid lines) after activation of the subject invention, thereby producing a lateral step to the left for the trailer.

Finally, the entire lateral movement of the trailer upon activation of the subject apparatus is shown in FIG. 8. The towed trailed in its initial position IP is shown in dashed lines. The subject device is activated and the trailer steps or hops to the left (as viewed from the rear of the trailer) into a new or final position FP, as seen in solid lines.

For safety considerations, the subject apparatus may incorporate (not shown in the figures) directional/safety-insurance means. The directional/safety-insurance means allows the user to activate the movement in a desired lateral direction and prevents the subject apparatus from functioning if an unsafe condition is detected. The directional/safety detection means that prevents accidental injury may include various limitations on user-activation of the subject device. Operation of the subject apparatus is normally limited to when the vehicle or associated vehicle (vehicle towing a secondary vehicle or trailed fitted with the subject apparatus) has its parking brakes (and/or normal braking means) engaged and/or the automatic transmission is in park or other safety acceptable gear or if the manual transmission is in neutral or other safety acceptable gear. Once all of the safety factors are acceptable the user is then permitted to move the vehicle in a lateral direction by activating the subject invention.

The exact way in which the gas pressure and electrical control module 10 functions may vary, depending on the exact needs of particular application. Typically, the pressurized gas enters the control module 10 via the gas entry port which accepts gas from a pressure line or hose connected to the gas supply means (compressor, pressurized gas tank, and the like). If the user desires the subject apparatus to activate (and, if desired, the necessary safety conditions are met), then the incoming pressurized gas is allowed to pass through a gas valve and on to expand the bladder device 35, via a pressure hose. If the subject device is fitted with directional/safety detection means and the situation is not safe, the bladder device 35 cannot be activated since the gas valve is closed. Assuming safe conditions exit, the user directs the lateral-motion to either the left or right by activating one or the other of the solenoids 80 or 85, via the control module 100. Again, whichever solenoid 80 or 85 is activated will pull the hinged bladder device 35 towards that side of the vehicle. The bladder device 35 then expands with incoming pressurized gas. The gripping foot pads 70 and 75 contact the supporting surface SS as the bladder device 35 expands and the vehicle is lifted in a user-desired angled direction. The bladder device 35 is then deactivated and deflates or contracts, which lowers the vehicle. As indicated above, the process is then repeated as many times as necessary to move the vehicle the desired lateral distance via small steps or hops or a "sliding shuffle" movement.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wheeled vehicle retractable lateral-motion apparatus that, under the direction of a user, moves a vehicle to which it is mounted in a generally perpendicular direction to a vehicle axis that extends between the front and rear of the vehicle, comprising:
   a) a mounting plate;
   b) vehicle attachment means for pivotally fastening said mounting plate to the vehicle;
   c) retractable vehicle lifting means secured to said mounting plate for elevating the vehicle above a supporting surface and lowering the vehicle back to said supporting surface as directed by the user, wherein said retractable vehicle lifting means retracts from contact with said supporting surface when inactivate and comprises:
      i) an expandable and contractible gas filled bladder pivotally attached to said mounting plate and
      ii) resilient means associated with said mounting plate for aiding in the contraction of said expanded bladder;
   d) lateral-motion inducing means coupled to said lifting means for displacing the vehicle to one side or the other of the vehicle axis while the vehicle is elevated above said supporting surface, wherein said lateral-motion inducing means comprises:
  i) opposing first and second solenoids secured to said vehicle attachment means and
  ii) first and second connectors running between said first and second solenoids and said bladder, wherein activation of said first solenoid displaces said bladder in a first lateral direction and activation of said second solenoid displaces said bladder in a second lateral direction and
e) control means for expanding and contracting said bladder and activating said first and second solenoids.

2. A vehicle lateral-motion apparatus according to claim 1, wherein said first and second connectors each include a resilient element.

3. A vehicle lateral-motion apparatus according to claim 1, further comprising gas supplying means for expanding said bladder.

4. A vehicle lateral-motion apparatus according to claim 1, wherein said vehicle attachment means for pivotally fastening said mounting plate to the vehicle comprises:
  a) a clamping bracket secured to the vehicle and
  b) a universal joint attached to and between said clamping bracket and said mounting plate.

5. A wheeled vehicle retractable lateral-motion apparatus that, under the direction of a user, moves a vehicle to which it is mounted in a generally perpendicular direction to a vehicle axis that extends between the front and rear of the vehicle, comprising:
  a) a removable mounting plate;
  b) vehicle attachment means for pivotally fastening said mounting plate to the vehicle;
  c) retractable vehicle lifting means secured to said mounting plate for elevating the vehicle above a supporting surface and lowering the vehicle back to said supporting surface as directed by the user, wherein said retractable vehicle lifting means retracts from contact with said supporting surface when inactivate and comprises:
    i) an expandable and contractible gas filled bladder pivotally attached to said mounting plate and
    ii) resilient means associated with said mounting plate for aiding in the contraction of said expanded bladder;
  d) lateral-motion inducing means coupled to said lifting means for displacing the vehicle to one side or the other of the vehicle axis while the vehicle is elevated above said supporting surface, wherein said lateral-motion inducing means comprises:
    i) directly opposing first and second solenoids secured to said vehicle attachment means and
    ii) first and second resilient connectors running between said first and second solenoids and said bladder, wherein activation of said first solenoid displaces said bladder in a first lateral direction and activation of said second solenoid displaces said bladder in a second lateral direction;
  e) a resilient foot pad located below said bladder; and
  f) control means for expanding and contracting said bladder and activating said first and second solenoids.

6. A wheeled vehicle retractable lateral-motion apparatus according to claim 5, further comprising gas supplying means for expanding said bladder.

7. A vehicle lateral-motion apparatus according to claim 5, wherein said vehicle attachment means for pivotally fastening said mounting plate to the vehicle comprises:
  a) a clamping bracket secured to the vehicle and
  b) a universal joint attached to and between said clamping bracket and said mounting plate.

8. A wheeled vehicle retractable lateral-motion apparatus that, under the direction of a user, moves a vehicle to which it is mounted in a generally perpendicular direction to a vehicle axis that extends between the front and rear of the vehicle, comprising:
  a) retractable vehicle lifting means secured to the vehicle for elevating the vehicle above a supporting surface and lowering the vehicle back to said supporting surface as directed by the user, wherein said retractable vehicle lifting means retracts from contact with said supporting surface when inactivated and comprises:
    i) an expandable and contractible gas filled bladder pivotally attached to the vehicle and
    ii) resilient means associated with said bladder for aiding in the contraction of said expanded bladder;
  b) lateral-motion inducing means coupled to said lifting means for displacing the vehicle to one side or the other of the vehicle axis while the vehicle is elevated above said supporting surface, wherein said lateral-motion inducing means comprises:
    i) opposing first and second solenoids secured to the vehicle and
    ii) first and second connectors running between said first and second solenoids and said bladder, wherein activation of said first solenoid displaces said bladder in a first lateral direction and activation of said second solenoid displaces said bladder in a second lateral direction and
  c) control means for expanding and contracting said bladder and activating said first and second solenoids.

* * * * *